Nov. 21, 1939.  F. C. MEYER  2,180,425
ELECTRIC CABLE SYSTEM
Filed Dec. 8, 1937  2 Sheets-Sheet 1
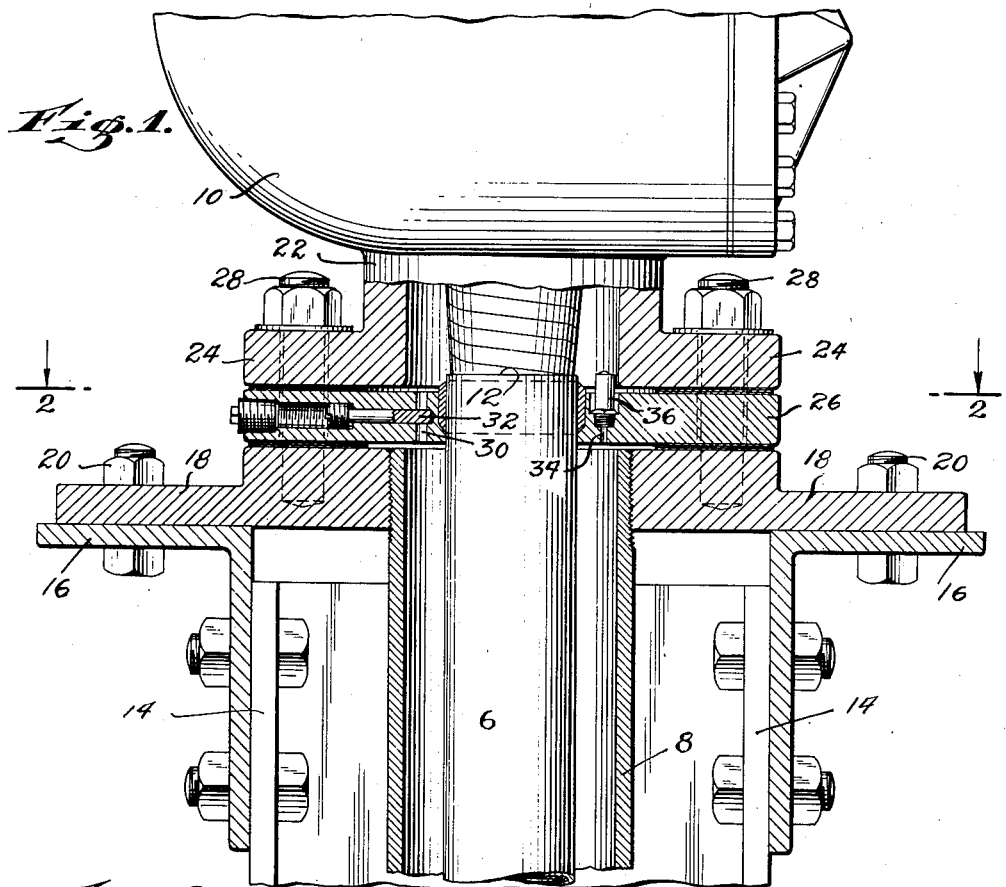
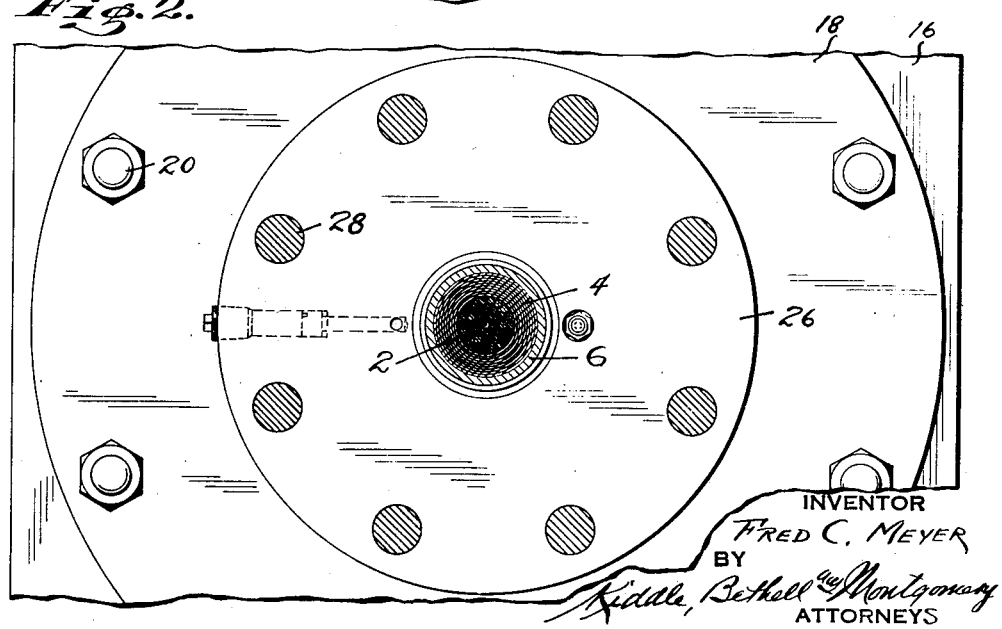
INVENTOR
FRED C. MEYER
BY
Riddle, Bethell and Montgomery
ATTORNEYS Nov. 21, 1939.   F. C. MEYER   2,180,425
ELECTRIC CABLE SYSTEM
Filed Dec. 8, 1937   2 Sheets-Sheet 2
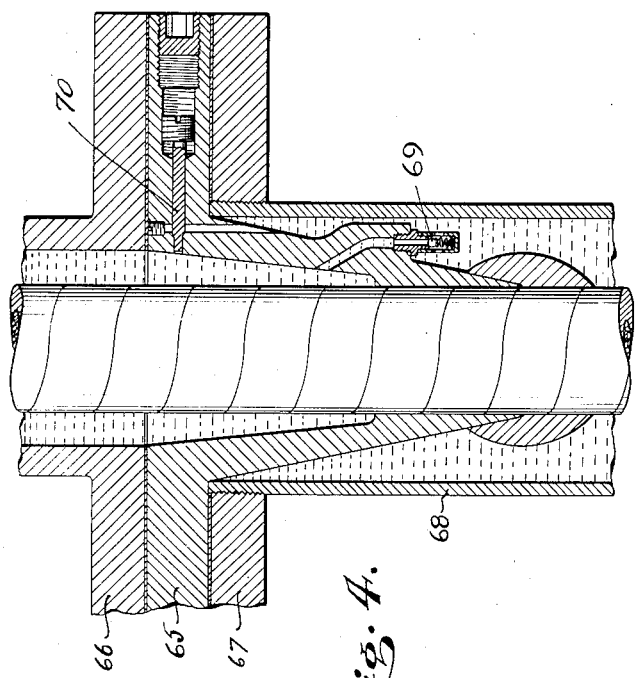
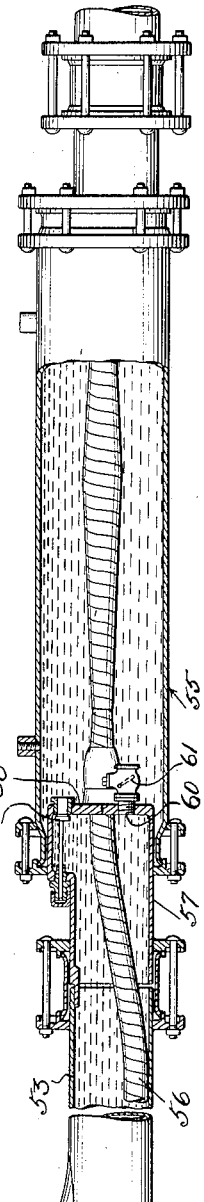
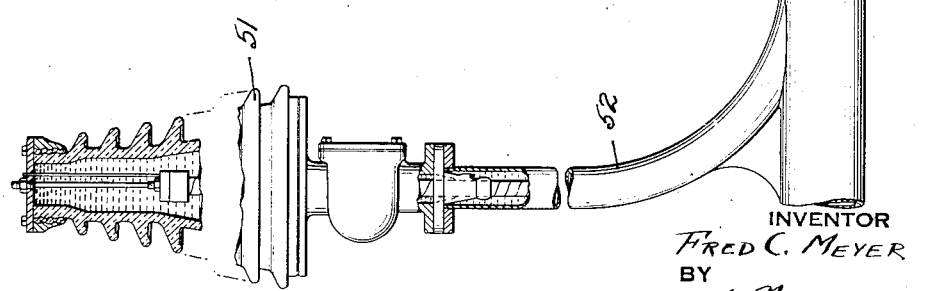
INVENTOR
Fred C. Meyer
BY
Kiddle, Bethell and Montgomery
ATTORNEYS Patented Nov. 21, 1939

2,180,425

UNITED STATES PATENT OFFICE 2,180,425

ELECTRIC CABLE SYSTEM

Fred C. Meyer, Wyckoff, N. J., assignor to The Okonite-Callender Cable Company, Incorporated, Paterson, N. J., a corporation of New Jersey Application December 8, 1937, Serial No. 178,686

1 Claim. (Cl. 174—11)

This invention relates to improvements in high tension electric cable systems and is particularly directed to an improved cable terminal structure.

The present invention is particularly well adapted for use in connection with any fluid filled cable system where pressure is built up in the system. One such example of a fluid filled cable system is disclosed in Bennett Patent No. 2,015,063, wherein the insulated conductors are submerged in a pipe line filled with oil which is maintained at a pressure of the order of 200 pounds per square inch whereby to increase the dielectric strength of the oil.

In cable systems of the character indicated terminals or potheads are provided. These potheads or terminals are generally made of porcelain and in operation the terminals or potheads and the cables are kept filled with an insulating fluid such as oil. Heretofore the cable and pothead have been in communication with each other, and considerable trouble has been experienced due to breakage and failure of these porcelain potheads caused by sudden temperature rises, increasing the volume of the oil in the system thereby building up excessive pressures. Trouble has been experienced also with draining the system of oil due to leakage, lightning and other causes.

It is an object of the present invention, therefore, to provide a structure in which the building up of excessive pressure in the pothead is prevented and in which in the event of failure of the pothead loss of the insulating fluid in the cable is prevented.

In one embodiment of my invention I provide a check plate intermediate the pothead and the cable system. This check plate is provided with a check valve which will permit of the passage of oil or other insulating fluid from the pothead to the cable, the valve being set to operate at a pressure considerably higher than that of the normal pressure in the cable, so that upon a sudden pressure rise in the cable this pressure cannot be transmitted to the pothead.

My invention may take various forms as illustrated in the accompanying drawings, in which drawings:

Fig. 1 is a sectional elevational view of a cable terminal showing one embodiment of my invention;

Fig. 2 is a sectional view on line 2—2 of Fig. 1;

Fig. 3 is an elevational view partly in section of another embodiment of my invention; and Fig. 4 is a sectional view of a further embodiment of the invention.

Referring to the drawings in detail and first to the form shown in Figs. 1 and 2. The numeral 2 designates a cable conductor of the solid stranded type, for example, enclosed in an insulation 4 of paper impregnated with an insulating fluid such as oil. This insulated conductor is enclosed in a lead sheath 6 about the insulation.

The cable is brought up through a riser pipe 8 into the pothead 10. The lead sheath terminates at 12.

At the terminal end of the cable is a vertically extending supporting beam 14, and secured to it are angle clips 16, these clips supporting a plate 18 which is secured to the clips by means of bolts 20.

The lower end of the pothead 10 is provided with a support in the form of a cylindrical member 22 provided with an annular flange 24.

Intermediate the flange 24 of the pothead support 22 and the end plate 18 is a check plate 26 secured in place by means of bolts 28.

The check plate 26 is provided with an oil inlet 30 through which oil may be suppled to the pothead when filling the cable. This inlet is normally closed by means of a hand operated needle type valve 32. By backing out the valve 32, oil can be admitted to the pothead from the cable.

The check plate 26 is also provided with a transverse port 34 controlled by a check valve 36. The valve 36 moves downward in unseating.

It will be apparent that when oil pressure is built up in the pothead, to the pressure for which the check valve 36 has been set, the valve will open and relieve the pressure whereby damage to the pothead from excessive pressures is eliminated. It will be apparent also that in the event of failure of the pothead from any cause, draining of the system of oil is prevented by the check valve.

With respect to the embodiment of my invention illustrated in Fig. 3, the pothead designated 51 is supported on and in communication with a riser or manifold pipe 52. The riser 52 is in communication with the pipe line 53 in which the cable 56 is installed.

55 is a semi-stop joint in the pipe line. 57 is a gland in the semi-stop joint and constitutes a barrier between the casing of the joint and the pipe line.

The end wall 58 of the gland may be provided with a built-in valve 59 similar to that shown in my prior Patent No. 2,070,974. This wall is provided with a port 60 equipped with a check valve 61. This check valve is so mounted that the oil or other insulating fluid of the system can only flow toward the joint from the pothead, the valve immediately closing upon a reversal of flow of the insulating fluid toward the pothead. It will be appreciated, therefore, that the only flow of insulating fluid to the pothead is that which seeps through the insulation and conductor strands which is a negligible amount. Accordingly, in the event of a sudden rise in pressure in the cable this pressure cannot be transmitted to the pothead. Also, in the event of failure of the pothead the system will not drain of insulating fluid.

Referring now to the form illustrated in Fig. 4, 65 designates a pothead check plate secured between the flange 66 of the pothead and the gland 67 secured to the riser pipe 68.

In the depending portion of the check plate 65 I provide a spring loaded check valve 69 similar to the check valve 36 of Fig. 1. This valve closes toward the pothead. In the check plate 65 I also provide a hand operated needle type valve 70 for the same purpose as the valve 32 of Fig. 1.

It will be appreciated that in the event of failure of the pothead of the structure shown in Fig. 4 loss of the oil of the system is prevented by the check valve 69. Likewise the building up of excessive pressure in the pothead is prevented by the opening of the check valve.

It will be appreciated from all of the foregoing that proper control of operating pressures within the potheads is provided under all conditions of operation of the cable system.

It will be appreciated also that my invention provides for maintaining the potheads filled with oil at all times regardless of whether the oil in the cable system be lowered or drained off entirely, thereby enabling the cable system to be operated temporarily under abnormal conditions.

It is to be understood, as stated at the outset, that my invention may be applied to various types of cable systems and that various modifications and changes may be made in the structures herein illustrated and described without departing from the spirit and scope of my invention.

What I claim is:

In combination a cable, fluid insulation therefor, a terminal for the cable filled with fluid insulation, and a check valve intermediate the cable and the terminal, said valve closing toward the terminal for preventing at all times the passage of insulating fluid from the cable to the terminal, said valve being set to open toward the cable to permit of passage of fluid insulation from the terminal to the cable upon the building up of a pressure in the terminal in predetermined excess to the pressure in the cable.

FRED C. MEYER.